(12) United States Patent
Ciccone

(10) Patent No.: US 6,416,315 B1
(45) Date of Patent: Jul. 9, 2002

(54) MOLD COLLET LIFTING RING

(75) Inventor: Vince Ciccone, Kleinburg (CA)

(73) Assignee: Top Grade Molds Ltd., Mississauga (CA)

( * ) Notice: Subject to any disclaimer, the term of this patent is extended or adjusted under 35 U.S.C. 154(b) by 0 days.

(21) Appl. No.: 09/465,470

(22) Filed: Dec. 16, 1999

(30) Foreign Application Priority Data

Feb. 2, 1999 (CA) .............................................. 2260681

(51) Int. Cl.[7] .............................................. B29C 33/44
(52) U.S. Cl. ........................ 425/556; 425/438; 425/443; 425/DIG. 58
(58) Field of Search ................................ 425/556, 577, 425/438, 441, 443, DIG. 58; 264/318, 334

(56) References Cited

U.S. PATENT DOCUMENTS 4,570,897 A * 2/1986 Von Holdt .................. 249/144
4,777,004 A * 10/1988 Galer ......................... 264/320
4,832,307 A * 5/1989 Watanabe et al. ............. 249/63
5,112,025 A * 5/1992 Nakayama et al. .......... 249/115
5,431,556 A * 7/1995 Luther ........................ 425/556

* cited by examiner

Primary Examiner—Robert Davis
Assistant Examiner—Donald Heckenberg
(74) Attorney, Agent, or Firm—Ridout & Maybee LLP

(57) ABSTRACT

A plastic injection mold is disclosed which is particularly suitable for molding plastic objects such as containers. The mold has a core assembly and a mating cavity assembly which define the shape of the object to be molded therein. Movable collets are located in the mold to define the shape of a portion of the object, such as a peripheral flange or rim. The collets are slidably guided by cam pins, so that upon opening of the mold, the collets can be lifted by actuators to separate and release the molded object. A collet lifting ring is located between the collets and the actuators to ensure that all of the collets separate simultaneously.

13 Claims, 7 Drawing Sheets

US 6,416,315 B1

MOLD COLLET LIFTING RING

BACKGROUND OF THE INVENTION

This invention relates to plastic injection molds, and in particular, to the type of molds used to produce plastic containers and lids therefore.

In the molding of plastic containers and lids, it is usually necessary to form peripheral flanges or skirts having lateral ribs or grooves to provide interlocking engagement between the containers and lids. In order to release these articles from the mold after they are molded, it is usually necessary to have moveable molding surfaces in the mold, which are referred to as collets. The collets open up or separate upon opening of the mold to allow the molded article to be removed. The collets are opened up or separated usually by some type of push-rods or push pads engaging the collets, and normally some type of cam mechanism is used to ensure that the collets move from a closed molding position to an open release position at the appropriate time in the molding cycle. Often the collets are lifted as they are separated, as this helps to eject the molded article from the mold core as well.

A difficulty with the above-mentioned arrangement is that the collets often do not open uniformly, either as a result of uneven wear of the moving components in the mold, or differences in the actuating devices used to move the collets.

In the present invention, the collets move much more uniformly. Rather than using individual actuators to move each collet, a collet lifting ring is employed to lift all of the collets simultaneously.

SUMMARY OF THE INVENTION

According to the invention, there is provided a plastic injection mold comprising a mold core assembly and a mating mold cavity assembly. The core assembly has a core portion defining the inside surface of a plastic object to be molded in the mold, and the cavity assembly has a cavity wall defining a portion of the outside surface of the object. One of the core and the cavity assemblies includes a plurality of collets surrounding the core portion. The collets also include means for defining a portion of the outside surface of the object to be molded. The core portion, the cavity wall and the collets define a closed space between the core portion, the cavity wall and the collets in the shape of the object to be molded. One of the core and cavity assemblies has a sprue for injecting molten plastic into the closed space and an air vent to permit air to escape therefrom. Guide means engage the collets for separating and moving the collets away from the core portion upon lifting of the collets. A collet lifting ring surrounds the core portion. Means are provided for a slidably coupling the collet lifting ring to the collets, and means are provided for lifting the collet lifting ring, so that upon lifting of the collet lifting ring, all of the collets are lifted and separated simultaneously.

BRIEF DESCRIPTION OF THE DRAWINGS

Preferred embodiments of the invention will now be described, by way of example, with reference to the accompanying drawings, in which.

DETAILED DESCRIPTION OF PREFERRED EMBODIMENT

Figure 1:
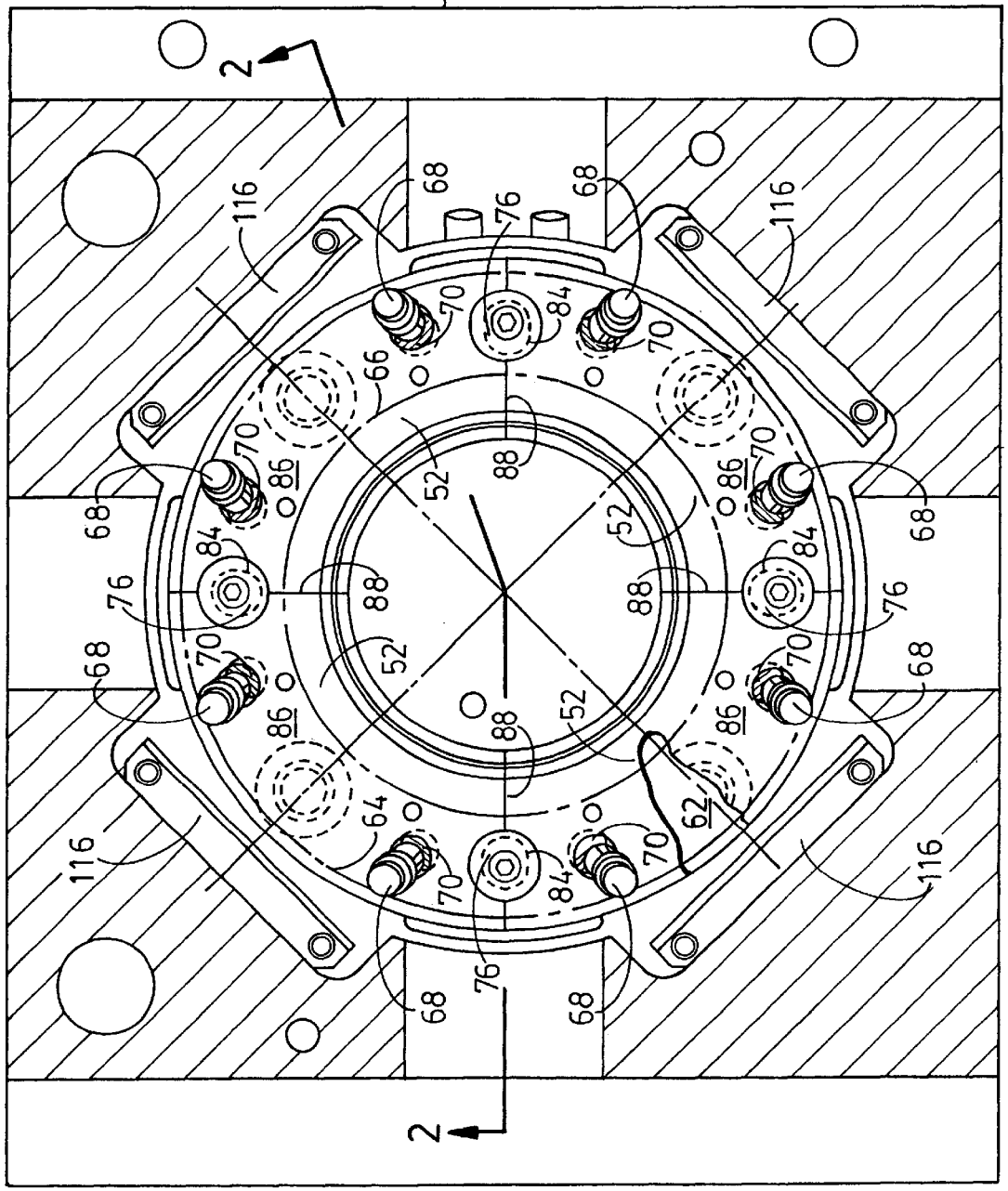
FIG. 1 is a schematic plan view looking at the inside of the core assembly of a preferred embodiment of a plastic injection mold according to the present invention.
Figure 2:
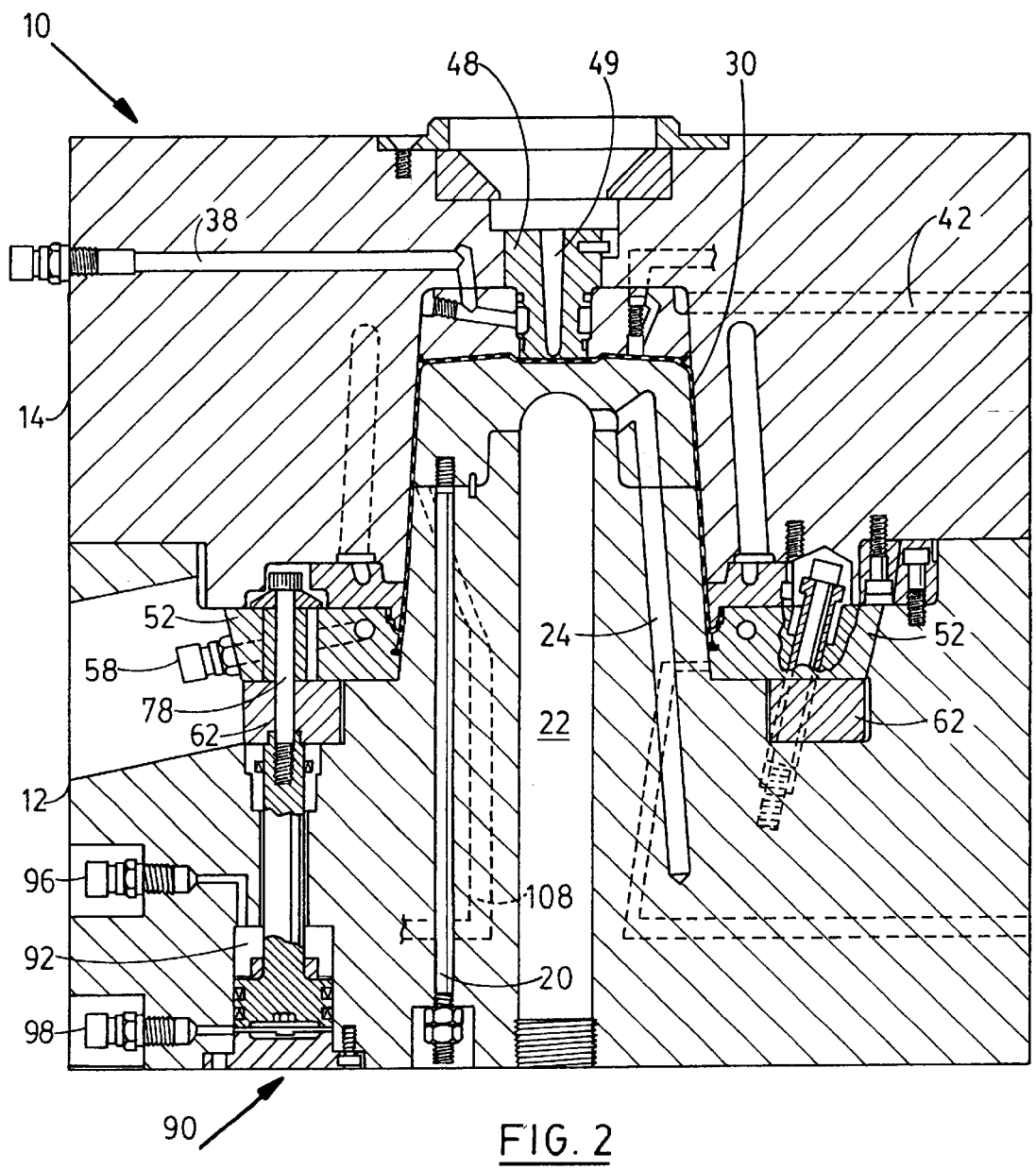
FIG. 2 is a sectional view taken along lines 2—2 of FIG. 1, but showing both the core assembly and the cavity assembly together just after molding a plastic container.
Figure 3:
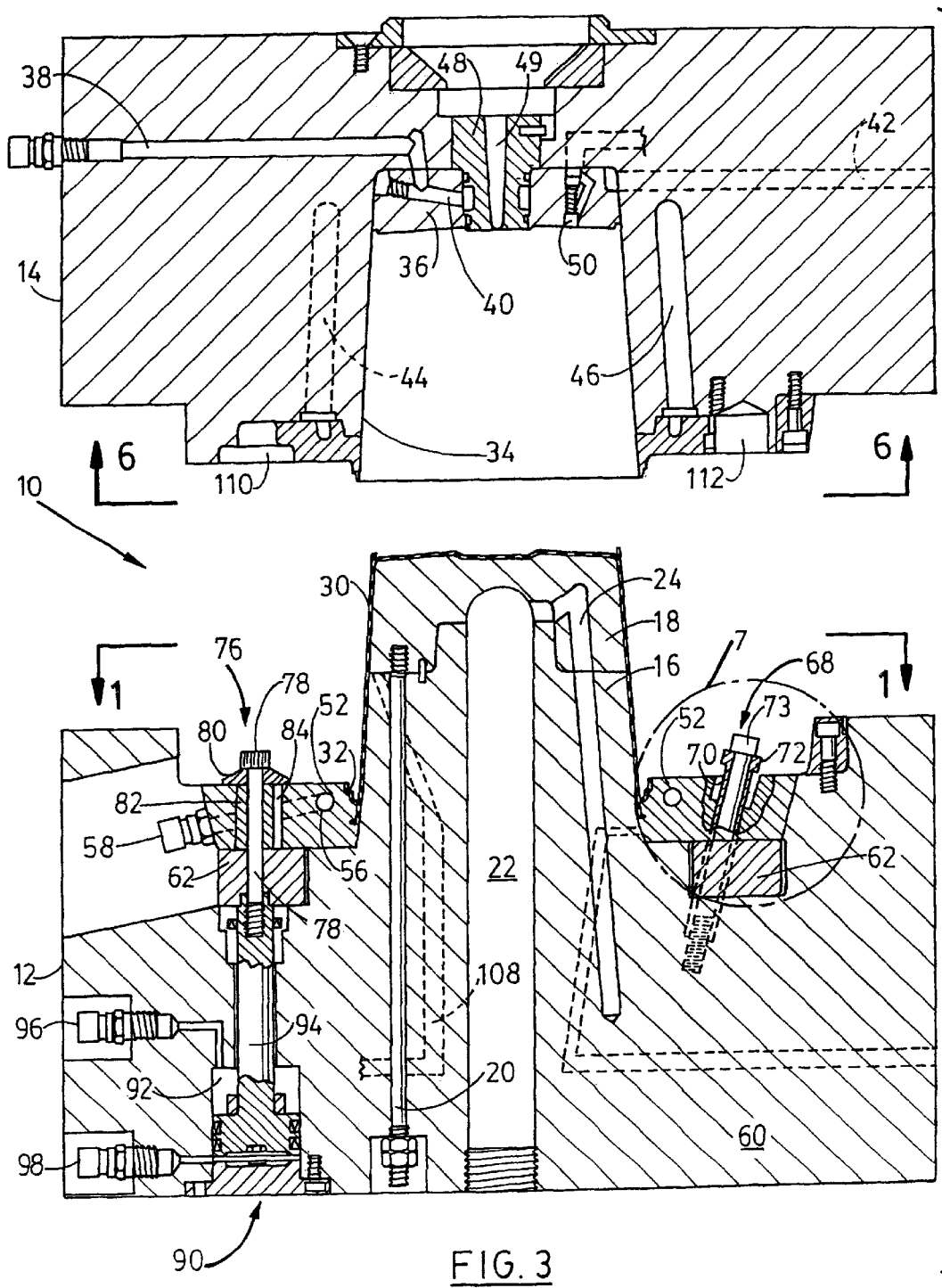
FIG. 3 is a sectional view similar to FIG. 2, but showing the cavity assembly separated from the core assembly.

Referring firstly to FIGS. 1 to 3, a preferred embodiment of a plastic injection mold is generally indicated in the drawings by reference numeral 10. Injection mold 10 includes a mold core assembly 12 and a mating cavity assembly 14. Referring in particular to FIG. 3, core assembly 12 includes a core portion 16 having a berylium copper cap 18 as is customary in this type of mold. Cap 18 is held in place by threaded fasteners 20. Core portion 16 is cooled by a central axial water cooling passage 22 which feeds a plurality of spaced-apart outer cooling passages 24 located adjacent to the periphery of core portion 16. Actually, outer cooling passages 24 are connected together in a serpentine fashion to evenly cool core portion 16, but this is not shown in the drawings for the purposes of simplification. The particular configuration of the cooling passages for core portion 16 depends upon the type and shape of object or article being molding in injection mold 10 and is just represented diagrammatically in the drawings.

Figure 4:
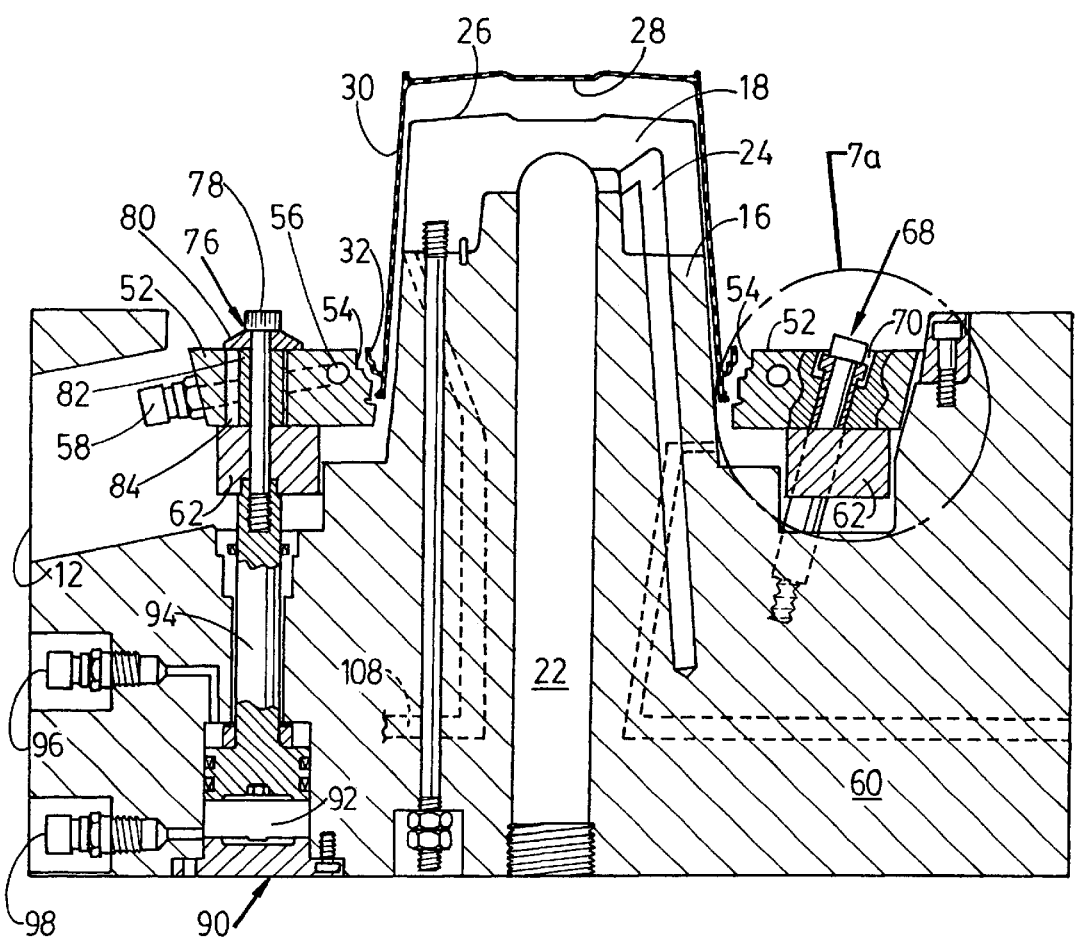
FIG. 4 is a vertical sectional view of just the core assembly of FIG. 3, but showing the collets in the lifted and separated position.

Referring briefly to FIG. 4, it will be appreciated that the outer surface 26 of core portion 16 defines the inside surface 28 of the object or article to be molded in injection mold 10, which in FIGS. 1 to 7 is a cylindrical container 30 having a peripheral flange or skirt 32.

As seen best in FIG. 3, cavity assembly 14 has a cavity wall 34 which defines at least a portion of the outside surface of container 30 or other object to be molded in injection mold 10. Cavity assembly 14 has a berylium copper bottom portion 36 and suitable cooling passages 38, 40, 42 for cooling water to be supplied to bottom portion 36 to cool bottom portion 36. Other cooling passages 44, 46 cool cavity assembly 14 adjacent to cavity wall 34. Again, all of these cooling passages are designed in accordance with the shape and wall thickness of the object to be molded in injection mold 10. The design of the cooling passages is just shown schematically in the drawings and is not considered to be a part of the present invention, per se.

Cavity assembly 14 also has a sprue assembly 48 having a sprue 49 for injecting plastic into mold 10 and an air vent 50 to permit air to escape from the closed space between core portion 16 and cavity wall 34 as plastic is being injected into the mold. It will be appreciated that cooling passages 38, 40 and 42 also cool sprue assembly 48.

As seen best in FIGS. 1, 3 and 4, a plurality of collets 52 surround core portion 16. Actually, collets 52 are annular segments, but for the purposes of this disclosure, are just referred to as collets. As seen best in FIG. 4, collets 52 have inner molding portions or surfaces 54 that define a portion of the outside surface of container 30, namely skirt 32. It will be appreciated that core portion 16, cavity wall 34 in cavity assembly 14 and collet molding surfaces 54 define a closed space between core portion 16 and the cavity wall 34 and collet molding surfaces 54. This closed space defines the shape and wall thickness of container 30 or any other object desired to be molded in mold 10.

Collets 52 have internal cooling passages 56, and each collet 52 is supplied with cooling water by its own cooling inlet 58. Similar cooling outlets are also provided for each collet, but these are not shown in the drawings for the purposes of clarification. Cooling inlets 58 and their associated cooling outlets are connected to flexible hoses because collets 52 move up and down and in and out, as will be described further below.

Figures 7, 7A:
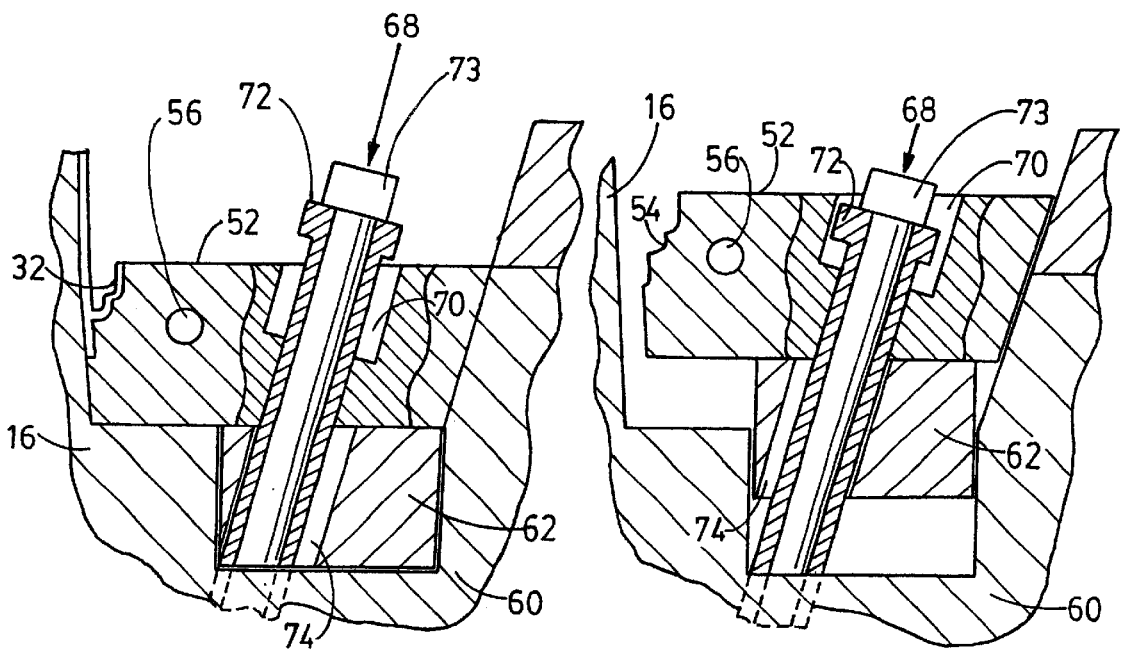
FIG. 7 is an enlarged sectional view showing the portion of FIG. 3 indicated by the chain-dotted circle 7.
FIG. 7A is an enlarged sectional view similar to FIG. 7 but showing the portion of FIG. 4 indicated by the chain-dotted circle 7A.

As seen best in FIGS. 3 and 4, core assembly 12 has a base portion 60. Core portion 16 projects from base portion 60. An annular collet lifting ring 62 is located concentrically about or surrounds core portion 16, and is located between base portion 60 and collets 52. Collet lifting ring 62 is represented in plan view in FIG. 1 by chain-dotted circles 64 and 66. Angularly disposed horn pin or cam pin assemblies 68 pass through angularly disposed recessed bores 70 in collets 52 and are threaded into base portion 60 of core assembly 12. Cam pin assemblies 68 include cam pins 72, which are like bearing or wear sleeves, and bolts or cap screws 73 that hold the cam pins 72 in place. Alternatively, cap screws 73 could come in from below in recessed openings in base portion 60, to engage cam pins 72 and retain them in position. Recessed bores 70 slidably accommodate cam pins 72 and cause the collets 52 to move outwardly from core portion 16 upon being lifted, as seen best in FIGS. 7 and 7A. Actually, collet lifting ring 62 lifts collets 52 causing this outward and upward movement of collets 52. Since collet lifting ring 62 moves vertically upwardly as seen in FIGS. 7 and 7A, collet lifting ring 62 has slotted clearance openings 74 to permit this vertical movement. It will be appreciated, however, that if cam pins 72 were crooked or bent, so that cam pin 72 had vertical portions passing through lifting ring 62, then clearance openings 74 could just be plain holes and collet lifting ring 62 would be slidably mounted on cam pins 72. Cam or horn pins 72 form guide means for engaging the collets for separating and moving the collets away from core portion 16 upon lifting of collets 52 by collet lifting ring 62. It will also be appreciated that since collets 52 move inwardly and outwardly or toward and away from core portion 16, that collets 52 are slidably mounted on collet lifting ring 62. This gives a large bearing surface to reduce wear on collets 52 as they move about.

Collets 52 are slidably coupled to collet lifting ring 62 by threaded collet retainers or assemblies 76. Collet retainers 76 include a bolt or cap screw 78, a washer 80 and a bearing sleeve or bushing 82 mounted on cap screw 78. As seen best in FIGS. 3 and 4, collets 52 are formed with slots 84 to slidably accommodate bearing sleeve 82. Slots 84 are orientated to permit collets 52 to move toward and away from core portion 16.

As seen best in FIG. 1, collets 52 are in the form of adjoining partial annular segments, each segment having a body portion 86 and there being joints 88 between the segments. In the embodiment shown in FIG. 1, the collet slots 84 and collet retainers 76 are located at the segment joints 88, half of the slots 84 being formed in each of the adjacent ends of adjacent collets 52. A modification to this will be described below in connection with FIG. 8, where slots 84 and collet retainers 76 are located in the body of the collet segments.

Referring again to FIGS. 3 and 4, piston and cylinder actuators 90 are located in the core assembly base portion 60. Actually, the cylinders of actuators 90 are formed by bores 92 in base portion 60. Pistons 94 located in cylinders or bores 92 are attached to collet lifting ring 62 by the cap screws 78 of collet retainers 76. In this way, collet retainers 76 are also attached to collet lifting ring 62 by the same cap screw 78. In this case, one actuator 90 is associated with or located below each collet retainer 76. However, it will. be appreciated that collet retainers 76 and actuators 90 could be attached to collet lifting ring 62 independently, and actuators 90 could be located in different positions, such as below the body portions 86 of collets 52.

Actuators 90 are activated by fluid lines 96, 98. Actuators 90 preferably are pneumatic, but they could be hydraulic, if desired.

Figure 5:
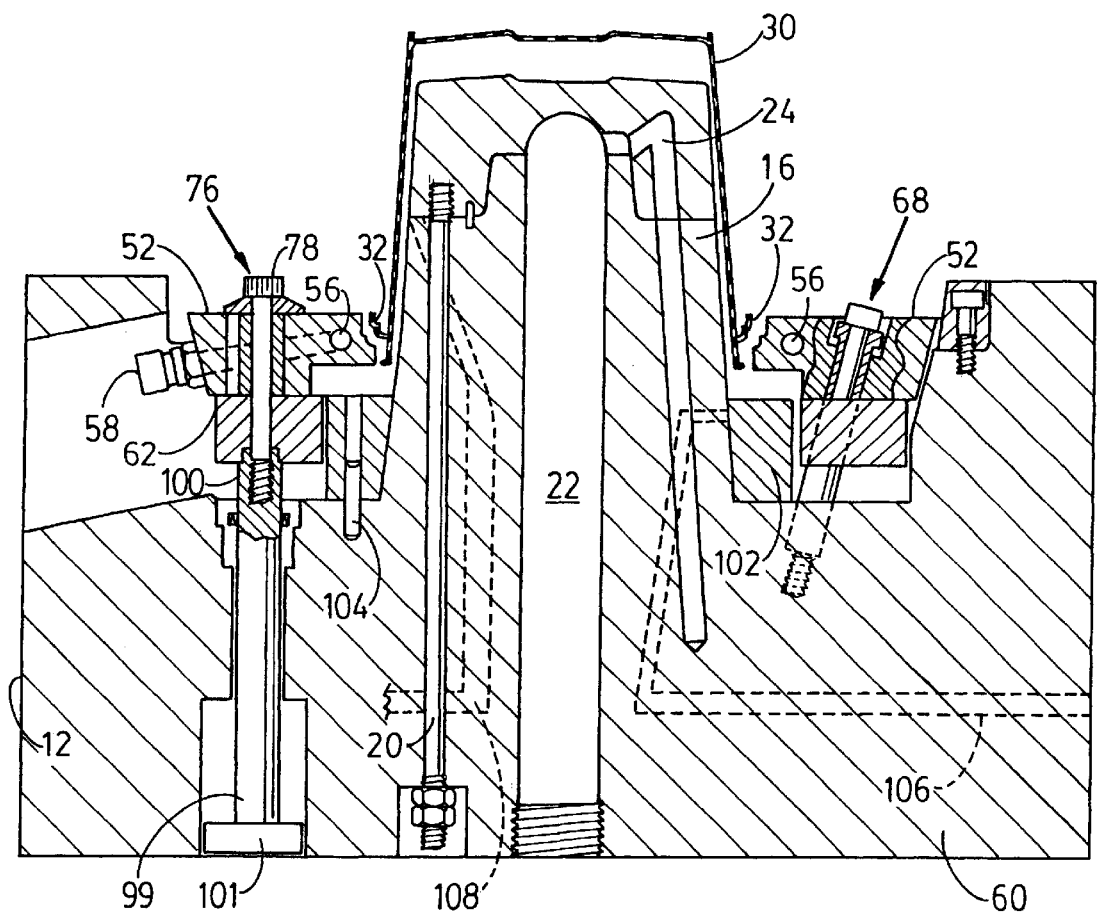
FIG. 5 is a vertical sectional view similar to FIG. 4 but showing alternative embodiments of various components of the present invention.

Referring next to FIG. 5, some modifications to core assembly 12 are shown. In this embodiment, actuators 90 are replaced by plain push rods 99 attached to collet lifting ring 62. Push rods 99 would be actuated by external means to cause collet lifting ring 62 to move up and down as seen in FIG. 5. Push rods 99 are slidably located in core assembly base portion 60. Each of the push rods 99 has an inner end 100 into which cap screw 78 is threaded to attach inner end portion 100 to collet lifting ring 62. The push rods 99 also have an outer end portion 101 located at the surface of the core assembly base portion 60 to be acted upon by an external actuation means.

In this embodiment also, an annular cooling ring 102 is located around the base of core portion 16. Cooling ring 102 is mounted on pins 104. Cooling lines 106 (only one of which is shown) provide coolant to cool cooling ring 102. The FIG. 5 embodiment is also shown to have a pneumatic ejector line 108, whereby air pressure is used to eject container 30 from core portion 16. In the embodiment shown in FIGS. 1 through 7, in addition to the air or pneumatic ejector 108, the collets 52 themselves also help initially to eject container 30 from core portion 16.

Figure 6:
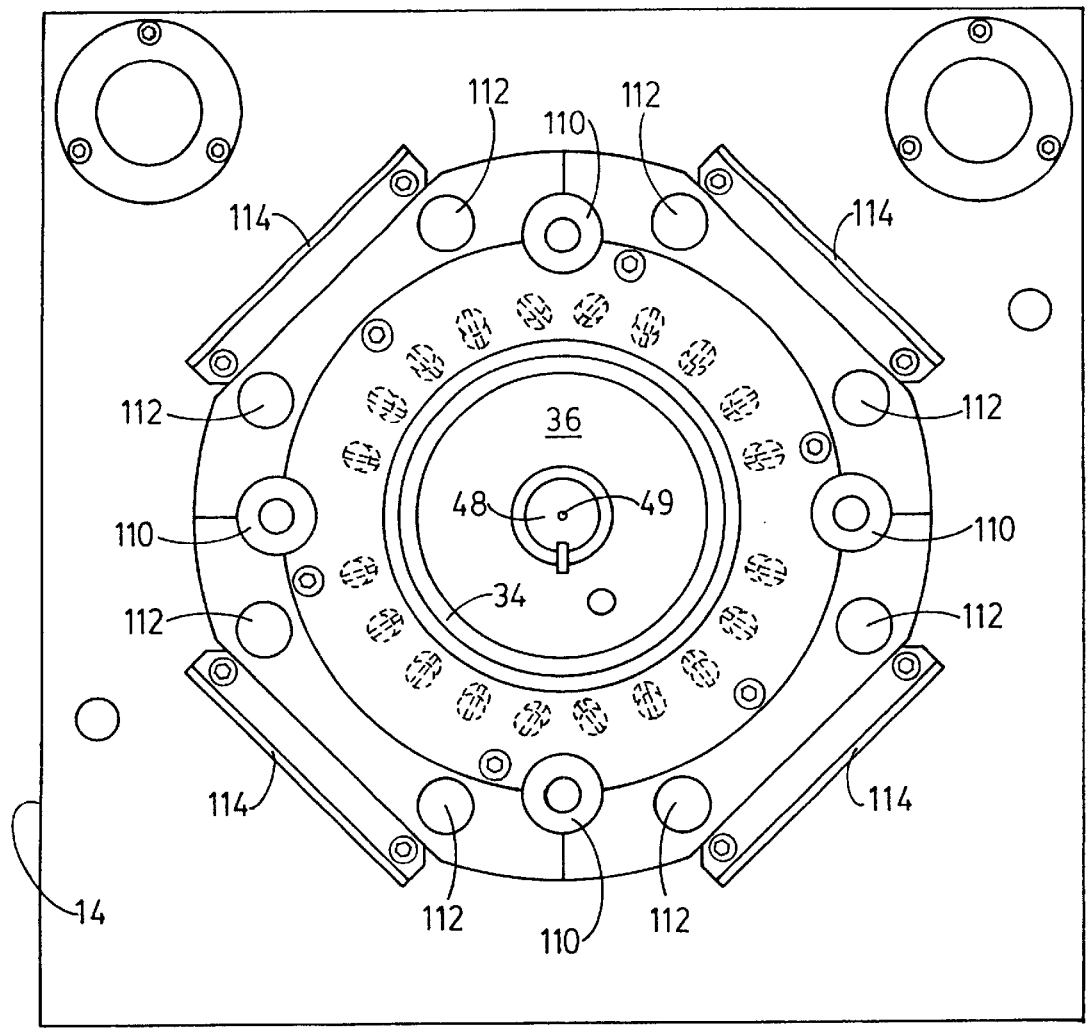
FIG. 6 is a plan view looking at the inside of the cavity assembly of the preferred embodiment of the plastic injection mold according to the present invention.

Referring next to FIG. 6, which shows the inside surface of cavity assembly 14, it will be noted that cavities 110 are formed in the surface of cavity assembly 14 to accommodate collet retainers 76. Also cavities 112 are formed therein to accommodate cam pin assemblies 68. FIG. 6 also shows the use of locking wedges 114 which engage locking wedges 116 as shown in FIG. 1 to lock the core and cavity assemblies 14 together in the closed position, as is common in injection molds.

Figures 8, 9:
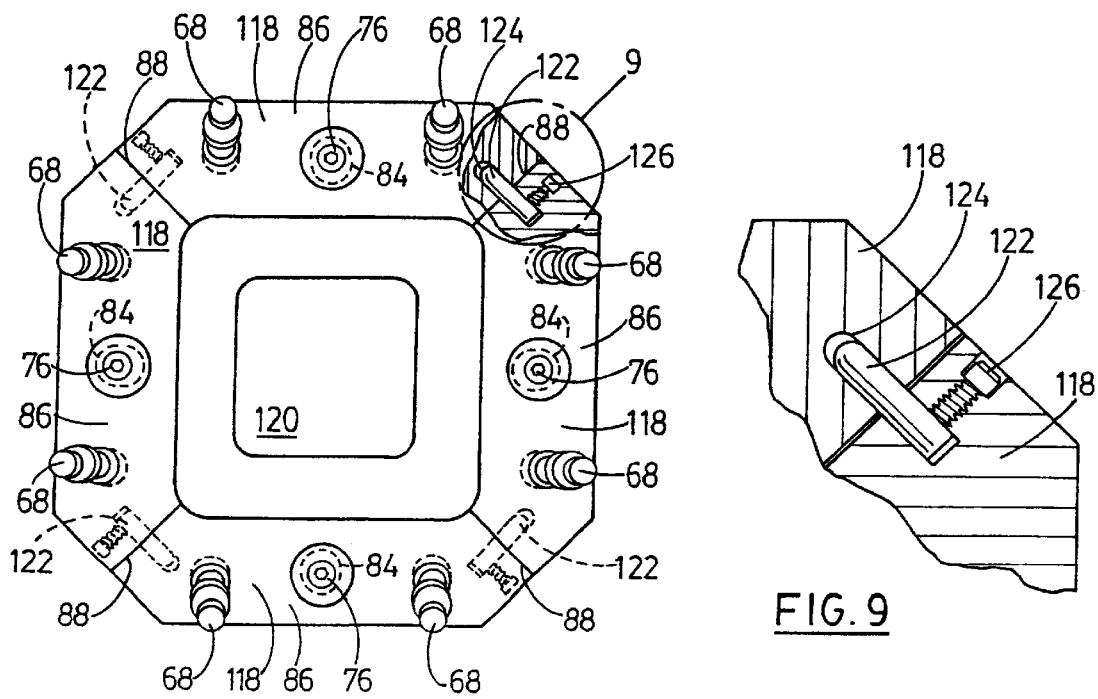
FIG. 8 is a plan view of a portion of another embodiment of a core assembly according to the present invention showing a rectangular configuration of collets.
FIG. 9 is an enlarged sectional view of the portion of FIG. 8 indicated by chain-dotted circle 9.

Referring next to FIGS. 8 and 9, a modification to the collets is shown wherein the collet segments 118 are more rectangular in shape to accommodate a rectangular core portion 120, such as would be used to produce a molded object or container that was square in plan view. In this embodiment, as mentioned above, the collet retainers 76 (and also actuators 90) are located in main body portions 86 of collets 118, rather than at joints 88. In order to keep the adjacent collets 118 from rising unevenly, lateral linking pins 122 extend between collet segments 118 at segment joints 88. Linking pins 122 are slidably mounted in recesses 124 in one of the collets 118 and are retained in position by a set screw 126 in the adjacent collet 118. Linking pins 122 allow the collet segments 118 to separate in a direction away from the core portion 120 in a common plane, but not transversely or laterally of one another. In the FIG. 8 embodiment, the collet lifting ring would also be square or rectangular in plan view to match the shape of the collets. Of course, the collets and collet lifting ring could have other shapes in plan view as well, such as oval or polygonal to match the shape of the container being molded.

In the operation of mold 10, the core and cavity assemblies 12, 14 are together as shown in FIG. 2. Plastic is injected to form the desired molded object such as container 30. When the plastic is cooled sufficiently, the mold is opened as indicated in FIG. 3. Actuators 90 or push rods 99 are activated to lift collet lifting ring 62. Collet lifting ring 62 lifts all of the collets 52 or 118 simultaneously, and the cam pin assemblies 68 cause the collets to open up or move away from core portion 16 releasing container 30. The collets initially help push container 30 off core portion 16 as they are raised, and pneumatic ejector line 108 completes the ejection of container 30 from mold 10. Actuators 90 are retracted and the molds close to return to the FIG. 2 configuration, whereupon the mold cycle can be repeated.

Having described preferred embodiments, it will be appreciated that various modifications will be made to the structures described above. For example, cam pin assemblies 68 are shown to pass through slotted or elongated openings in collet lifting ring 62, but collet lifting ring 62 could be formed with notches to accommodate cam pins 68. Four collets in an annular arrangement have been shown for each of the embodiments of FIGS. 1 and 8. Fewer or more collet segments could be used. Also, the collets could be spaced apart, for example, where it is desired that flanges 32 not be continuous around the periphery of the object to be molded. As a further example, it may be desired to produce handles on opposite sides of a container, in such a case, only opposed collets may be necessary to produce these handles.

The terms "above" and "below" and lifting have been used above in connection with mold 10. It will be appreciated, however, that mold 10 can be orientated any way desired, either horizontally or vertically, or even upside down, so these terms used are considered to be relative.

The collet lifting rings and collets have been described as being mounted in the core assembly 12, but these components could be mounted in the cavity assembly 14 if desired. Also, the collet lifting ring 62 could be mounted above the collets to lift the collets by pulling them upwardly as seen in FIG. 2 instead of pushing them upwardly.

This invention applies to all sizes of plastic container molds. It is particularly useful where fast ejection of the molded products is desired, and especially in multi-cavity molds where all of segments must move uniformly.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A plastic injection mold comprising:
   a mold core assembly and a mating mold cavity assembly, the core assembly having a core portion defining the inside surface of a plastic object to be molded in the mold, and the cavity assembly having a cavity wall defining a portion of the outside surface of said object;
   one of the core and cavity assemblies including a plurality of collets surrounding the core portion, the collets also including means for defining a portion of the outside surface of said object;
   the core portion, the cavity wall and the collets defining a closed space between the core portion, the cavity wall and collets in the shape of said object;
   one of the core and cavity assemblies having a sprue for injecting molten plastic into said closed space and an air vent to permit air to escape therefrom;
   guide means engaging the collets for separating and moving the collets outwardly away from the core portion upon lifting of the collets upwardly away from the core portion;
   a collet lifting ring surrounding the core portion; means for slidably coupling the collet lifting ring to the collets; and means for lifting the collet lifting ring upwardly away from the core portion, so that upon said lifting of the collet lifting ring, all of the collets are lifted and separated simultaneously.

2. A plastic injection mold as claimed in claim 1, wherein the collets are mounted in the core assembly, the core assembly including a base portion, the core portion projecting from the base portion, and the collet lifting ring being located between the base portion and the collets.

3. A plastic injection mold as claimed in claim 2 wherein the guide means are a plurality of angularly disposed cam pins passing through the collets, the collets having angularly disposed bores to slidably accommodate the cam pins and cause the collets to move outwardly from the core portion upon being lifted.

4. A plastic injection mold as claimed in claim 3 wherein the cam pins also pass through the collet lifting ring, the collet lifting ring defining clearance openings for the cam pins.

5. A plastic injection mold as claimed in claim 4 wherein the cam pins are straight and the collet clearance openings are in the form of slots to allow the collet lifting ring to be lifted.

6. A plastic injection mold as claimed in claim 2 wherein the collets are formed with slots passing therethrough, wherein the means for slidably coupling the collet lifting ring to the collets are threaded collet retainers passing through the slots, the slots being orientated to permit the collets to move toward and away from the core portion.

7. A plastic injection mold as claimed in claim 6 wherein the collets are in the form of adjoining segments, each segment having a body portion and there being joints between the segments, and wherein the collet slots and collet retainers are located in the body portions of the segments.

8. A plastic injection mold as claimed in claim 6 wherein the collets are in the form of adjoining segments, each segment having a body portion and there being joints between the segments, and wherein the collet slots and collet retainers are located at the segment joints.

9. A plastic injection mold as claimed in claim 7 and further comprising lateral linking pins extending between the collet segments at the segment joints, the linking pins being slidably mounted in at least one of the segments allowing the segments to separate in a direction away from the core portion but not transversely of one another.

10. A plastic injection mold as claimed in claim 2 wherein the means for lifting the collet lifting ring are a plurality of piston and cylinder actuators located in the core assembly base portion, and further including means for attaching the pistons to the collet lifting ring.

11. A plastic injection mold as claimed in claim 2 wherein the means for lifting the collet lifting ring are a plurality of push rods slidably located in the core assembly base portion, each of the push rods having an inner end portion, means for attaching the inner end portion to the collet lifting ring, the push rods also each having an outer end portion located at the surface of the core assembly base portion to be acted upon by external actuation means.

12. A plastic injection mold as claimed in claim 10 wherein the collets are formed with slots passing therethrough wherein the means for slidably coupling the collet lifting ring to the collets are threaded collet retainers passing through the slots into the collet lifting ring, the slots being orientated to permit the collets to move toward and away from the core portion, and the threaded collet retainers also being the means for attaching the pistons to the collet lifting ring.

13. A plastic injection mold as claimed in claim 11 wherein the collets are formed with slots passing therethrough, wherein the means for slidably coupling the collet lifting ring to the collets are threaded collet retainers passing through the slots into the collet lifting ring, the slots being orientated to permit the collets to move toward and away from the core portion, the threaded collet retainers also being the means for attaching the inner ends of the push rods to the collet lifting ring.

\* \* \* \* \*